United States Patent
Rimböck et al.

(10) Patent No.: US 12,065,457 B2
(45) Date of Patent: Aug. 20, 2024

(54) PROCESS FOR PREPARING METHYLCHLOROSILANES WITH STRUCTURE-OPTIMISED SILICON PARTICLES

(71) Applicant: Wacker Chemie AG, Munich (DE)

(72) Inventors: Karl-Heinz Rimböck, Heldenstein (DE); Michael Müller, Burghausen (DE); Natalia Sofina, Burghausen (DE)

(73) Assignee: Wacker Chemie AG, Munich (DE)

( * ) Notice: Subject to any disclaimer, the term of this patent is extended or adjusted under 35 U.S.C. 154(b) by 183 days.

(21) Appl. No.: 17/429,652

(22) PCT Filed: Jun. 14, 2019

(86) PCT No.: PCT/EP2019/065735
§ 371 (c)(1),
(2) Date: Aug. 10, 2021

(87) PCT Pub. No.: WO2020/249237
PCT Pub. Date: Dec. 17, 2020

(65) Prior Publication Data
US 2022/0119422 A1  Apr. 21, 2022

(51) Int. Cl.
*C07F 7/16* (2006.01)
*B01J 23/72* (2006.01)

(52) U.S. Cl.
CPC ............ *C07F 7/16* (2013.01); *B01J 23/72* (2013.01)

(58) Field of Classification Search
CPC ............ B01J 23/72; C07F 7/16; C07F 7/02
See application file for complete search history.

(56) References Cited

U.S. PATENT DOCUMENTS

| 4,986,971 A | 1/1991 | Forwald et al. |
| 5,334,738 A | 8/1994 | Pachaly et al. |
| 2010/0160664 A1 | 6/2010 | Colin et al. |
| 2017/0267702 A1* | 9/2017 | Barr .......... B01J 23/06 |

FOREIGN PATENT DOCUMENTS

JP   H1059983 A   3/1998

OTHER PUBLICATIONS

Elkem (www.elkem.com/products/silicon/silicon-metalloid; downloaded May 4, 2023, pp. 1-3).*
Lobusevich, N.P et al.: Effect of Dispersion of Silicon and Copper in Catalysts on Direct Synthesis, Khimiya Kremniiorganich. Soed. 1988, pp. 27-35. Only English translated abstract was considered. Chemical Abstracts Service, Columbus, Ohio, US, 1988, XP002797297.

* cited by examiner

Primary Examiner — Pancham Bakshi

(57) ABSTRACT

A process for producing methylchlorosilanes of general formula 1, $(CH_3)_n H_m SiCl_{4-n-m}$, in which n represents values from 1 to 3 and m represents values of 0 or 1 in a fluidized bed reactor is provided. A chloromethane-containing reaction gas is reacted with a particulate contact mass containing silicon in the presence of copper catalyst. An operating granulation contains at least 1% by mass of silicon-containing particles S described by a structural parameter S. S has a value of at least 0 and is calculated according to equation (1), $$S = (\varphi_s - 0.70) \cdot \frac{\rho_{SD}}{\rho_F},$$

wherein $\varphi_S$ is symmetry-weighted sphericity factor, $\rho_{SD}$ is poured density [g/cm³], and $\rho_F$ is average particle solids density [g/cm³].

13 Claims, 1 Drawing Sheet

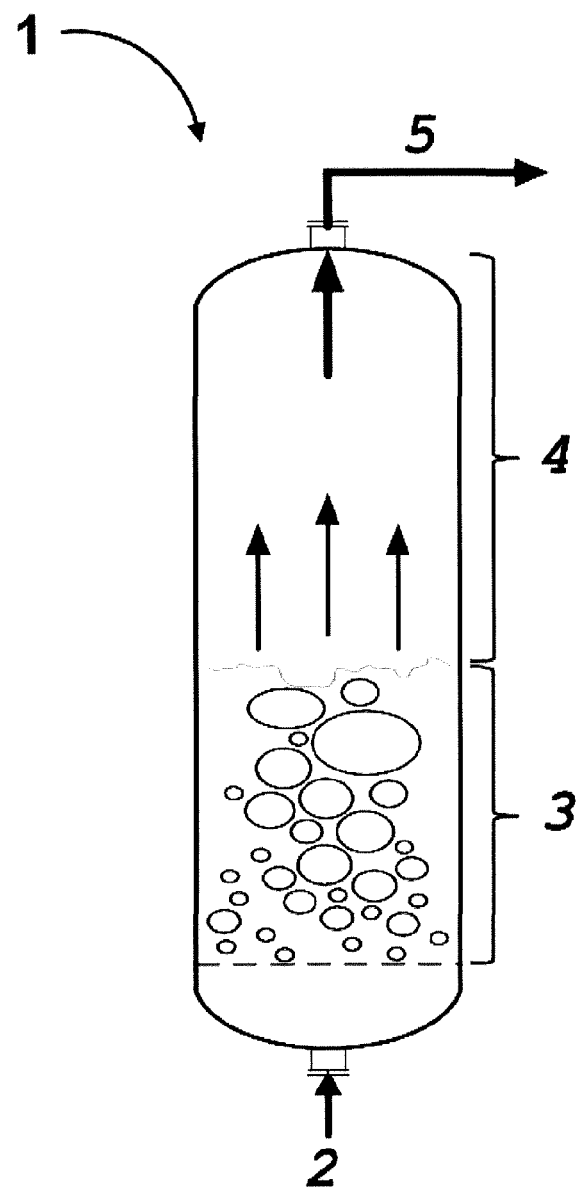

PROCESS FOR PREPARING METHYLCHLOROSILANES WITH STRUCTURE-OPTIMISED SILICON PARTICLES

CROSS-REFERENCE TO RELATED APPLICATION

This application is a U.S. National Phase Application of PCT/EP2019/065735, filed Jun. 14, 2019, the contents of which is hereby incorporated by reference in its entirety.

BACKGROUND

The invention relates to a process for producing methylchlorosilanes from a chloromethane-containing reaction gas and a particulate silicon contact mass containing structurally optimized silicon particles in a fluidized bed reactor.

The market for silicon products is a rapidly changing environment for businesses active therein. Changing demand, increasing quality requirements, varying prices of raw materials and energy and tighter regulations demand a high degree of operative agility and efficiency to achieve the best possible economy.

A particularly important product group falls under the technical description silicones: the class of polysiloxanes. Industrial production of silicones is carried out by hydrolysis and subsequent condensation of organochlorosilanes. In industrial silicon chemistry lethylsiloxanes dominate and the synthesis of the corresponding starting materials, the chloro (methyl)silanes, therefore has the greatest economic importance. The latter are industrially produced almost exclusively by the so-called Müller-Rochow direct synthesis (MRDS).

In MRDS an organic compound comprising carbon-bonded chlorine, usually chloromethane (MeCl), and silicon are generally reacted in the presence of a catalyst and optionally suitable promoters to afford organochlorosilanes, in particular chloro(methyl)silanes (MCS) according to reaction equation (1).

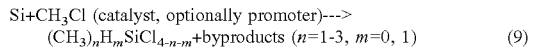

$$(CH_3)_nH_mSiCl_{4-n-m}+\text{byproducts } (n=1-3, m=0, 1) \quad (9)$$

Typical principal products and byproducts of MRDS and typically obtained proportions thereof are summarized in table 1. Impurities such as hydrocarbons and metal chlorides may also be a constituent of the byproducts. To produce high-purity organochlorosilanes a distillation thus generally follows.

TABLE 1

| Silane | Formula | Typical proportion [% by mass] |
|---|---|---|
| Dimethyldichlorosilane | $(CH_3)_2SiCl_2$ | 75-94 |
| Methyltrichlorosilane | $(CH_3) SiCl_3$ | 3-15 |
| Trimethylchlorosilane | $(CH_3)_3SiCl$ | 2-5 |
| Methyldichlorosilane | $(CH_3)HsiCl_2$ | 0.5-4 |
| Dimethylchlorosilane | $(CH_3)_2HsiCl$ | 0.1-0.5 |
| Tetrachlorosilane | $SiCl_4$ | <0.1 |
| Tetramethylsilane | $(CH_3)_4Si$ | 0.1-1 |
| Trichlorosilane | $HsiCl_3$ | <0.1 |
| Disilanes | $(CH_3)_xSi_2Cl_{6-x}$ | 2-8 |

In addition to a highest possible productivity (amount of formed organochlorosilanes per unit time and reaction volume) and a highest possible selectivity—in particular based on the principally most important target product dimethyldichlorosilane (DMDCS, $(CH_3)_2SiCl_2$)—a highest possible silicon utilization, associated with a safe and also flexible operation of the entire plant, is also demanded. DMDCS is required for example for the production of linear and cyclic siloxanes which may themselves be further polymerized to produce a broad spectrum of polydimethylsiloxanes. A longest possible uptime of the reactors between shutdown for cleaning purposes is also sought.

MRDS may be performed discontinuously or continuously. In both variants large industrial scale production of the organochlorosilanes is carried out in principle via a fluidized bed reaction, wherein the reaction gas containing chloromethane simultaneously serves as the fluidization medium. The fluidized bed reaction of MRDS is a complex process where many different influencing variables and technical fields intersect.

The most important parameters which influence the operative performance of MRDS are in principle DMDCS selectivity, productivity, low formation of higher boiling byproducts, bysilane selectivity and/or ratio (bysilanes are all silanes other than DMDCS formed in MRDS), MeCl conversion and silicon utilization.

The known processes are fundamentally complex and energy intensive. Thus for example the cooling of the reactors represents a considerable cost factor. In addition to the adjustable reaction parameters the operative performance of MRDS in a fluidized bed reactor has a decisive dependence especially on the raw materials. It is further necessary for a continuous process mode in particular to introduce the reactant components silicon and MeCl as well as the catalysts and optionally promoters into the reactor under the reaction conditions and this is associated with considerable technical complexity. Discontinuous MRDS processes are generally similarly complex. It is therefore important to realize a highest possible productivity—amount of formed organochlorosilanes per unit time and reaction volume—and a highest possible selectivity based on the desired target product (typically DMDCS).

The demands on the silicon in terms of chemical composition and particle size distribution for the synthesis of organo-chlorosilanes are relatively well researched; by contrast the structural makeup of silicon particles and the influence thereof on the reaction with halide-containing reaction gases has only been described in terms of intermetallic phases. The way in which all three influencing factors must interact to operate a particularly high-performance chlorosilane production process has hitherto not been described.

Thus, DE 4303766 A1 discloses a process for producing methylchlorosilanes from silicon and chloromethane in the presence of a copper catalyst and optionally promoter substances, wherein the production rates of the individual methylchlorosilanes based on the surface area of the employed silicon are controlled through the structure of the silicon, wherein the process is characterized in that the silicon having the desired structure is selected according to a structural index QF, wherein the structural index QF is determined such that a) silicon test specimens are cut open to form a cut surface,
b) on the cut surface the areas of precipitations of intermetallic phases having an elongate shape are summed to form an area number A,
c) on the cut surface the areas of precipitations of intermetallic phases having a rounded shape are summed to form an area number B, and d) the quotient described as the structural index QF is formed from the area number A and the area number B.

The correlation of QF of different silicon structure types with their behavior in MRDS allows identification of optimal structural features in the silicon and thus control of selectivity and yields for the desired methylchlorosilanes in the desired direction. In this document the term "structure" relates to the size of the crystals of the polycrystalline silicon and the composition and position of the intermetallic phases which are precipitated with silicon from the main impurities, for example Al, Ca, Fe and Ti, in the course of cooling and solidification in the production process. This document thus merely expands on findings relating to previously mentioned demands on the silicon in terms of chemical composition for synthesis of organochlorosilanes. Furthermore, this type of manipulation entails the purchase of tailored silicon types and/or operation of corresponding in-house silicon production and enormous analytical effort. The structural index QF may be used to refine the structural parameter S of the present invention but is not essential.

US 20100160664 A1 discloses a process for producing alkylhalosilanes by reaction of an alkyl halide with a contact mass consisting of silicon and a catalyst system containing a copper catalyst and a group of promoter additives, wherein the copper catalyst is employed as a particulate copper halide. The copper catalyst particles are specified as follows:
  sphericity factor of 0.6 to 1.
  Particle size distribution having a value for $d_{50}$ of 50 to 1500 μm
  porous microstructure with not more than 0.2 ml/g at pore diameters of 0.1 to 10 μm
  a flowability of at least 8.

According to the document the process results in an activity of at least 210 g of silanes/h/kg and a DMDCS selectivity of at least 85% by mass based on the silanes obtained from the reaction. It thus merely describes the structure of the catalyst particles and gives no indication of the constitution that the silicon particles and operating granulation (granulation introduced into the fluidized bed reactor) must have to generate the greatest possible productivity and economy in the production of alkylhalosilanes.

In addition to an undesirably high formation of byproducts the process costs are fundamentally also increased by unconverted silicon.

It is known in the production of chlorosilanes in fluidized bed reactors to specifically remove fine grain fractions of the silicon particles to be employed. For example Lobusevich, N. P et al, "*Effect of dispersion of silicon and copper in catalysts on direct synthesis*", Khimiya Kremniiorganich. Soed. 1988, 27-35, recite an operating granulation for silicon of 70 to 500 μm, wherein 70 μm is the minimum and 500 μm is the maximum grain size (grain size limits or range limits) and the values are equivalent diameters. Lobusevich et al. report that when choosing the contact mass grain size for the synthesis of methylchlorosilanes, ethylchlorosilane and trichlorosilane the interaction between solids and gas must be considered in order to achieve maximum stability and efficiency of the process. In all cases—both for catalyzed variants and for uncatalyzed variants—increasing the silicon particle size results in an increased selectivity for the respective target products (in terms of the present invention: DMDCS). The authors further report that the structure of silicon particles influences the synthesis of methylchlorosilanes. It was thus found that silicon granulations having a comparable particle size distribution which were produced by different milling processes from the same silicon type (i.e. greatest comparability, since identical within typical variations in terms of purity, quality and content of secondary elements/impurities) exhibit different activities in MRDS. This was investigated using the example of granulations produced using a ball mill or using a roller mill. In the case of granulations from the ball mill the activities/reaction rates were 10-30% above those for the granulations from the roller mill and the authors attributed this to the structure of the particles. In direct comparison with particles from the roller mill granulation the particles of the granulation from the ball mill had a more irregular shape.

However, increasing the particle size in principle entails greater energy costs since a higher reaction temperature is required to accelerate the reaction and a higher gas velocity is required to generate the fluidized bed. While Lobusevich et al. report that use of a proportion of smaller silicon particles in the context of a polydisperse particle mixture enhances the activity of the silicon on account of an increased surface area, the use of proportions of small silicon particles is associated with difficulties since increased discharge of silicon particles from the reactor and aggregation of the particles can occur. It is therefore advantageous according to Lobusevich et al., despite the higher energy costs, to reduce the breadth of the grain size distribution of the employed silicon particles, to increase the average particle size and to minimize the symmetry and regularity of the surface structure of the particles.

The present invention has for its object to provide a particularly economic process for methylchlorosilane production by MRDS.

BRIEF SUMMARY

Embodiments of a process for producing methylchlorosilanes in a fluidized bed reactor are provided. In an embodiment, the process is of the general formula 1, $(CH_3)_nH_mSiCl_{4-n-m}$, in which n represents values from 1 to 3 and m represents values of 0 or 1. A chloromethane-containing reaction gas is reacted with a particulate contact mass containing silicon in the presence of copper catalyst. An operating granulation contains at least 1% by mass of silicon-containing particles S described by a structural parameter S. S has a value of at least 0 and is calculated according to equation (1), $S=(\varphi_s-0.70)\cdot\rho_{SDF}/\rho_F$, wherein $\varphi_S$ is symmetry-weighted sphericity factor, $\rho_{SD}$ is poured density [g/cm³], and $\rho_F$ is average particle solids density [g/cm³].

BRIEF DESCRIPTION OF THE VIEW OF THE DRAWING

The above, as well as other advantages of the present invention will become readily apparent to those skilled in the art from the following detailed description when considered in the light of the accompanying drawing in which:

FIG. 1 is a schematic diagram showing a fluidized bed reactor in accordance with embodiments of the invention.

DETAILED DESCRIPTION

The invention therefore provides a process for producing methylchlorosilanes of general formula 1

$(CH_3)_nH_mSiCl_{4-n-m}$ (1), in which
n represents values from 1 to 3 and
m represents values of 0 or 1 in a fluidized bed reactor, wherein a chloromethane-containing reaction gas is reacted with a particulate contact mass containing silicon in the presence of copper catalyst, wherein the operating granulation, i.e. the granulation or granulation mixture introduced into the fluidized bed reactor, contains at least 1% by mass of silicon-containing particles S described by a structural parameter S, wherein S has a value of at least 0 and is calculated as follows:

$$S = (\varphi_s - 0.70) \cdot \frac{\rho_{SD}}{\rho_F},\qquad \text{equation (1)}$$

wherein
$\varphi_S$ is symmetry-weighted sphericity factor
$\rho_{SD}$ is poured density [g/cm$^3$]
$\rho_F$ is average particle solids density [g/cm$^3$].

It has now been found that, surprisingly, the production of methylchlorosilanes in fluidized bed reactors may be performed particularly economically when silicon-containing particles having certain structural properties are employed in the operating granulation. It was found that this effect is already significantly detectable above a proportion of 1% by mass of the structurally optimized silicon particles S in the operating granulation. The use of precisely such silicon particles S brings about the lasting reduction in the dust fraction<70 μm described in Lobusevich, N P et al, "*Effect of dispersion of silicon and copper in catalysts on direct synthesis*", Khimiya Kremniiorganich. Soed. 1988, 27-35 in the production process due to a reduction in dust formation through abrasion. This gives rise to several advantages over the prior art:

higher DMDCS selectivity
reduced formation of high boilers
higher silicon utilization (lower losses through dust emission)
more homogeneous contact mass in terms of particle size distribution and resulting improvement in fluid mechanical properties of the fluidized bed
reduction in blocked and/or clogged plant parts due to aggregation of finely divided particles or of dust fractions (particles having a particle size ≥70 μm)
improved conveyability of the particle mixture
lower abrasion through structurally optimized particles
longer reactor uptimes The prejudice of Lobusevich et al. according to which activity of a silicon granulation increases with the irregularity/shapelessness of its particles is also overcome. This is because, by definition, the particles S having a structural parameter S of ≥0 have a relatively high degree of symmetry—it transpires that activity also increases with increasing mass fraction of particles S of ≥0 in the operating granulation. Surprisingly, the negative effects to be expected upon reducing average particle size according to the present understanding of the art such as elevated emission of relatively small silicon particles from the reactor and the occurrence of aggregation effects were not observed. On the contrary, the process according to the invention exhibited improved fluidization characteristics of the contact mass in addition to the previously recited advantages.

The term "granulation" is to be understood as meaning a mixture of silicon-containing particles producible for example by so-called atomization or granulation of silicon-containing melts and/or by comminution of chunk silicon by means of crushing and milling plants. The chunk silicon may preferably have an average particle size of >10 mm, particularly preferably >20 mm, in particular >50 mm. Granulations may be classified into fractions essentially by sieving and/or sifting.

A mixture of different granulations may be described as a granulation mixture and the granulations making up the granulation mixture as granulation fractions. Granulation fractions may be graded relative to one another according to one or more properties of the fractions such as for example into coarse grain fractions and fine grain fractions. A granulation mixture may in principle be graded into more than one granulation fraction in defined relative fractions.

The operating granulation describes the granulation or granulation mixture introduced into the fluidized bed reactor.

The symmetry-weighted sphericity factor cps is the product of the symmetry factor and the sphericity. Both shape parameters are determinable by dynamic image analysis according to ISO 13322, wherein the obtained values represent the volume-weighted average over the particular sample of the relevant particle mixture of the operating granulation.

The symmetry-weighted sphericity factor of the particles S is preferably at least 0.70, particularly preferably at least 0.72, very particularly preferably at least 0.75, in particular at least 0.77 and at most 1.

The sphericity of a particle describes the ratio between the surface area of a particle image and the circumference. Thus a spherical particle would have a sphericity approaching 1, while a jagged, irregular particle image would have a roundness approaching zero.

When determining the symmetry factor of a particle the center of gravity of a particle image is initially determined. Routes from edge to edge through the particular center of gravity are then drawn in each measurement direction and the ratio of the two resulting route sections measured. The value of the symmetry factor is calculated from the smallest ratio of these radii. For high-symmetry figures such as circles or squares the value of the particular symmetry factor is equal to 1.

Further shape parameters determinable by dynamic image analysis are the width/length ratio (a measure of the extension/elongation of a particle) and the convexity of particles. However, since said parameters are already indirectly contained in the structural parameter S in the form of the symmetry factor they need not be determined in the process according to the invention.

The poured density is defined as the density of a mixture of a particulate solid (so-called bulk solid) and a continuous fluid (for example air) that fills the voids between the particles. The poured density of the grain fraction of the operating granulation having a structural parameter S≥0 is preferably 0.8 to 2.0 g/cm$^3$, particularly preferably 1.0 to 1.8 g/cm$^3$, very particularly preferably 1.1 to 1.6 g/cm$^3$, in particular 1.2 to 1.5 g/cm$^3$. Poured density is determinable according to DIN ISO 697 via the ratio of the mass of the bulk material to the occupied volume of the bulk material.

The average, mass-weighted particle solids density $\rho_F$ of the particles S of the grain fraction having a structural parameter S≥0 is preferably 2.20 to 2.70 g/cm$^3$, particularly preferably 2.25 to 2.60 g/cm$^3$, very particularly preferably 2.30 to 2.40 g/cm$^3$, in particular 2.31 to 2.38 g/cm$^3$. Determination of the density of solid substances is described in DIN 66137-2:2019-03.

The grain fraction having a structural parameter S≥0 is present in the operating granulation preferably in a mass fraction of at least 1% by mass, particularly preferably of at least 5% by mass, very particularly preferably of at least 10% by mass, in particular of at least 20% by mass.

The operating granulation preferably has a particle size parameter $d_{50}$ of 70 to 1500 µm, particularly preferably of 80 to 1000 µm, very particularly preferably of 100 to 800 µm, in particular of 120 to 600 µm.

The difference between the particle size parameters $d_{90}$ and $d_{10}$ is a measure of the breadth of a granulation or a granulation fraction. The quotient of the breadth of a granulation or a granulation fraction and the respective particle size parameter $d_{50}$ corresponds to the relative breadth. This may be used for example to compare particle size distributions having very different average particle sizes.

The relative breadth of the granulation of the operating granulation is by preference 0.1 to 500, preferably 0.25 to 100, particularly preferably 0.5 to 50, in particular 0.75 to 10.

Determination of particle sizes and particle size distribution may be carried out according to ISO 13320 (laser diffraction) and/or ISO 13322 (image analysis). Calculation of particle size parameters from particle size distributions may be carried out according to DIN ISO 9276-2.

In a further preferred embodiment the operating granulation has a mass-weighted surface area of 80 to 1800 cm$^2$/g, preferably of 100 to 600 cm$^2$/g, particularly preferably of 120 to 500 cm$^2$/g, in particular of 150 to 350 cm$^2$/g.

The granulation mixture of the operating granulation preferably has a p-modal volume-weighted distribution density function, wherein p=1 to 10, preferably p=1 to 6, particularly preferably p=1 to 3, in particular p=1 or 2. For example a 2-modal distribution density function has two maxima.

The use as the contact mass of granulation mixtures having a polymodal (for example p=5 to 10) distribution density function makes it possible to avoid sifting effects (separation of individual grain fractions in the fluidized bed, for example a bipartite fluidized bed). These effects occur especially when the maxima of the distribution density function of the granulation mixture are far apart.

The contact mass is in particular the granulation mixture in contact with the reaction gas, which may be admixed with catalyst and also promoter. Said mass is preferably a silicon-containing granulation mixture containing at most 5% by mass, particularly preferably at most 2% by mass, in particular at most 1% by mass, of other elements as impurities. Said mass is preferably metallurgical silicon ($Si_{mg}$) which typically has a purity of 98% to 99.5% by mass. A typical contact mass is for example a composition comprising 98% by mass of silicon metal, wherein the remaining 2% by mass is generally very largely composed of the following elements selected from: Fe, Ca, Al, Ti, Cu, Mn, Cr, V, Ni, Mg, B, C, P and O. The contact mass may also contain the following elements selected from: Co, W, Mo, As, Sb, Bi, S, Se, Te, Zr, Ge, Sn, Pb, Zn, Cd, Sr, Ba, Y and Cl. The use of silicon having a lower purity of 75% to 98% by mass is, however, also possible. However, the silicon metal proportion is by preference greater than 75% by mass, preferably greater than 85% by mass, particularly preferably greater than 95% by mass.

The copper catalyst contains copper, is present in the reaction and may be added to the operating granulation and/or the contact mass for example in metallic, alloyed and/or salt form. Chlorides and/or oxides or alloys of the catalytically active elements in particular may be concerned. Preferred compounds are CuCl, $CuCl_2$, CuO or mixtures thereof. The operating granulation and/or the content mass may further contain promoters, for example Sn, Zn and/or zinc chloride. The constitution of the catalyst and/or the promoter is irrelevant for the process according to the invention—these may be added in any (structural) form.

The elemental composition of the employed silicon and the contact mass may be determined for example by X-ray fluorescence analysis (XFA), ICP-based analytical methods (ICP-MS, ICP-OES) and/or atomic absorption spectrometry (AAS).

Based on silicon the catalyst is preferably present in the fluidized bed reactor in a proportion of 0.1% to 20% by mass, particularly preferably of 0.5% to 15% by mass, in particular of 0.8% to 10% by mass, especially preferably of 1% to 5% by mass.

The grain fractions having structural parameters S<0 and S≥0 are preferably supplied to the fluidized bed reactor as a pre-prepared granulation mixture. Any further constituents of the contact mass may likewise be present. The inventive proportion of a fraction having a structural parameter S≥0 of at least 1% by mass in the operating granulation results in the latter having inter alia better flow and thus conveying characteristics.

The grain fractions having structural parameters S<0 and S>0 may also be supplied to the fluidized bed reactor separately, in particular via separate feed conduits and containers. Mixing then takes place in principle upon formation of the fluidized bed (in situ). Any further constituents of the contact mass may likewise be supplied separately or as a constituent of either of the two grain fractions.

The process is preferably carried out at a temperature of 220° C. to 380° C., particularly preferably 280° C. to 350° C. The absolute pressure in the fluidized bed reactor is preferably 0.05 to 1 Mpa, particularly preferably 0.08 to 0.8 Mpa, in particular 0.1 to 0.6 Mpa.

The reaction gas preferably comprises at least 50% by volume, preferably at least 70% by volume, particularly preferably at least 90% by volume, of MeCl before entry into the reactor. In addition to MeCl the reaction gas may further contain one or more components selected from the group comprising chlorosilanes, methylchlorosilanes, hydrocarbons, HCl, $H_2$, CO, $CO_2$, $O_2$ and $N_2$. These components may be present as impurities in a recycled gas for example and/or employed deliberately to control the desired selectivity.

The reaction gas may further contain a carrier gas which does not take part in the reaction, for example nitrogen or a noble gas such as argon.

The composition of the reaction gas is typically determined by Raman and infrared spectroscopy and gas chromatography before it is supplied to the reactor. This may be done either via samples taken in the manner of spot checks and subsequent "off-line analyses" or else via "online" analytical instruments connected to the system.

It is preferable when a quotient of fluidized bed height to reactor diameter in the fluidized bed reactor is 10:1 to 1:1, preferably 8:1 to 2:1, particularly preferably 6:1 to 3:1. The fluidized bed height is the thickness or extent of the fluidized bed.

The preferred organochlorosilane of general formula 1 is dimethyldichlorosilane. The process is therefore preferably optimized for selectivity and productivity for dimethyldichlorosilane. Also generated in addition to organochlorosilanes of general formula 1 are "high-boiling compounds" or "high boilers" which are compounds consisting of silicon, chlorine, carbon and optionally hydrogen and/or oxygen and have a higher boiling point than DMDCS (70° C. at 1013 hPa). These are generally disilanes and higher oligosilanes or polysilanes and also siloxanes.

The process is preferably part of an integrated system for producing polysiloxanes. The process may further be part of an integrated system for producing silicone elastomers, silicone oils, functional siloxanes, silicone resins, silicone resin formulations, linear and cyclic polydimethylsiloxanes, silicates, organofunctionalized silanes, chlorosilanes and polysilicon.

FIG. 1 shows, by way of example, a fluidized bed reactor 1 for performing the process according to the invention. The reaction gas 2 is preferably blown into the contact mass from below and optionally from the side (for example tangentially or orthogonally to the gas stream from below), thus fluidizing the particles of the contact mass and forming a fluidized bed 3. To initiate the reaction the fluidized bed 3 is generally heated using a heating apparatus (not shown) arranged externally to the reactor. Heating is typically not necessary during continuous operation. A portion of the particles is transported by the gas flow from the fluidized bed 3 into the free space 4 above the fluidized bed 3. The free space 4 is characterized by a very low solids density which decreases in the direction of the reactor outlet 5.

EXAMPLES

All examples employed silicon of the same type in terms of purity, quality and content of secondary elements and impurities. The grain fractions employed in the operating granulations were produced by crushing chunk $Si_{mg}$ (98.9% by mass Si) and subsequent milling or by atomization techniques known to those skilled in the art to produce particulate $Si_{mg}$ (98.9% by mass Si). Said fractions were optionally classified by sieving/sifting. Grain fractions having certain values for structural parameter S were thus produced in targeted fashion. Contact masses having defined mass fractions of silicon-containing particles having a structural parameter S of not less than 0 were subsequently blended by combining and mixing these grain fractions. The remainder of the grain fractions comprised silicon-containing particles having a structural parameter S of less than 0. The grain fractions together summed to 100% by mass. To ensure the greatest possible comparability between the individual experiments no additional catalysts or promoters were added.

The following process was employed in all examples. The granulations employed in the experiments had particle size parameters $d_{50}$ between 320 and 340 µm. During the experiments the operating temperature of the fluidized bed reactor was about 340° C. This temperature was kept approximately constant over the entire experimental duration using a cooling means. The reaction gas, consisting of $CH_3Cl$, and the operating granulation were added in such a way that the height of the fluidized bed remained substantially constant over the entire experimental duration and the granulation is fluidized over the entire reaction time. The reactor was operated at 0.05 Mpa of positive pressure over the entire experimental duration. Both a liquid sample and a gas sample were taken in each case after a run time of 3 h (constant productivity and selectivity achieved). The condensable proportions of the product gas stream (chlorosilane gas stream) were condensed at −40° C. using a cold trap and analyzed by gas chromatography (GC) before selectivity for dimethyldichlorosilane of general formula 1 (DMDCS selectivity) and [% by mass] were determined therefrom. Detection was via a thermal conductivity detector. In addition, the DMDCS selectivity and the productivity [kg/(kg*h)], i.e. the produced amount of methylchlorosilane of general formula 1 per hour [kg/h] based on the amount of contact mass (operating granulation) employed in the reactor [kg], weighted with the DMDCS selectivity, was used as a basis. After each run the reactor was emptied completely and refilled with contact mass.

The employed operating granulations and the results of the experiments are summarized in table 2. ms is the mass fraction of particles S having a structural parameter S>0.

TABLE 2

| Experiment | S | mS ≥ 0 [% by mass] | DMDCS selectivity [% by mass] | Productivity [kg/(kg*h)] |
|---|---|---|---|---|
| VB1* | 0.005 | 0.02 | 82 | 0.10 |
| VB2* | 0.005 | 0.2 | 83 | 0.12 |
| VB3* | 0.005 | 0.5 | 83 | 0.14 |
| AB1 | 0.005 | 1 | 86 | 0.16 |
| AB2 | 0.005 | 5 | 86 | 0.23 |
| AB3 | 0.005 | 10 | 90 | 0.31 |
| AB4 | 0.005 | 20 | 91 | 0.31 |
| AB5 | 0.005 | 50 | 92 | 0.33 |
| AB6 | 0.005 | 75 | 94 | 0.30 |
| AB7 | 0.005 | 95 | 95 | 0.30 |
| AB8 | 0.050 | 20 | 92 | 0.33 |
| AB9 | 0.053 | 20 | 93 | 0.34 |
| AB10 | 0.040 | 20 | 92 | 0.33 |

*noninventive

The productivity [kg/(kg*h)], i.e. the produced amount of methylchlorosilanes of general formula 1 per hour [kg/h] based on the amount of contact mass (operating granulation) [kg] employed in the reactor, and the DMDCS selectivity were used as a basis for evaluation of the selected combinations of S and mS≥0 [% w] and definition of the optimal ranges. A productivity of >0.15 kg/(kg*h and a DMDCS selectivity≥86% based on the amount of methylchlorosilanes of general formula 1 are considered optimal and acceptable respectively. VB1 to VB5 and AB1 to AB10 are listed as representatives of a multiplicity of experiments performed for determining the optimal ranges. In experiments VB1 to VB5 the productivity and/or the DMDCS selectivity are inadequate. The optimal ranges for the parameters upon which the indices are based were determined from a multiplicity of such negative examples. The ranges recited at the outset in the example are therefore larger than the claimed ranges. The experiments verify that methylchlorosilanes, in particular DMDCS, may be produced by MRDS particularly productively and selectively when the process is performed in the optimal ranges of the indices S and mS≥0 [% w].

The invention claimed is:

1. A process for producing methylchlorosilanes of general formula 1

$$(CH_3)_n H_m SiCl_{4-n-m} \quad (1),$$

in which
n represents values from 1 to 3 and
m represents values of 0 or 1
in a fluidized bed reactor, wherein a chloromethane-containing reaction gas is reacted with a particulate contact mass containing silicon in the presence of copper catalyst,
wherein an operating granulation, i.e. the granulation or granulation mixture introduced into the fluidized bed reactor, contains at least 1% by mass of silicon-containing particles S described by a structural parameter S, wherein S has a value of greater than 0 and is calculated as follows:

equation (1)

wherein
$\varphi_S$ is symmetry-weighted sphericity factor
$\rho_{SD}$ is poured density [g/cm³]
$\rho_F$ is average particle solids density [g/cm³].

2. The process as claimed in claim 1, wherein the symmetry-weighted sphericity factor cps of the particles S is greater than 0.70 and less than or equal to 1, wherein the sphericity of the particles S describes the ratio between the surface area of a particle image and the circumference.

3. The process as claimed in claim 1, wherein the average particle solids density $\rho_F$ of the particles S having a structural parameter S>0 is 2.20 to 2.70 g/cm³, wherein the determination is carried out according to DIN 66137-2:2019-03.

4. The process as claimed in claim 1, wherein the operating granulation has a particle size parameter $d_{50}$ of 70 to 1000 μm, wherein the particle size parameter is determined according to DIN ISO 9276-2.

5. The process as claimed in claim 1, wherein the silicon is a metallurgical silicon ($Si_{mg}$) having a purity of 98% to 99.5% by mass silicon.

6. The process as claimed in claim 1, wherein the copper catalyst is selected from CuCl, $CuCl_2$, CuO or mixtures thereof.

7. The process as claimed in claim 1, wherein the temperature is from 220° C. to 380° C.

8. The process as claimed in claim 1, wherein the reaction gas contains at least 50% by volume of MeCl before entry into the reactor.

9. The process as claimed in claim 1, wherein the produced methylchlorosilane of general formula 1 is dimethyldichlorosilane (DMDCS).

10. The process as claimed in claim 1, wherein the poured density ranges from 0.8 to 2.0 g/cm³.

11. A process for producing methylchlorosilanes of general formula 1

$$(CH_3)_n H_m SiCl_{4-n-m} \tag{1}$$

in which
n represents values from 1 to 3 and
m represents values of 0 or 1
in a fluidized bed reactor, wherein a chloromethane-containing reaction gas is reacted with a particulate contact mass containing silicon in the presence of copper catalyst,
wherein an operating granulation, i.e. the granulation or granulation mixture introduced into the fluidized bed reactor, contains at least 1% by mass of silicon-containing particles S described by a structural parameter S, wherein S has a value of greater than 0 and is calculated as follows:

$$S = (\varphi\_s - 0.04) \cdot \rho\_SD / \rho\_F \tag{equation (1)}$$

S-(q_s-0.70);p_SD/p_F equation (1),
wherein
$\varphi S$ is symmetry-weighted sphericity factor
$\rho SD$ is poured density [g/cm3]
$\rho F$ is average particle solids density [g/cm3],
the symmetry-weighted sphericity factor QS of the particles S is greater than 0.70 and equal to or less than 1, and
the sphericity of the particles S describes the ratio between the surface area of a particle image and the circumference, wherein the average particle solids density $\rho_F$ is 2.20 to 2.70 g/cm3, according to DIN 66137-2:2019-03.

12. The process as claimed in claim 1, wherein the operating granulation contains at least 10% by mass of silicon-containing particles S.

13. The process as claimed in claim 1, wherein S has a value of at least 0.05.

* * * * *